US008854847B2

(12) United States Patent
Farnsworth (10) Patent No.: US 8,854,847 B2
(45) Date of Patent: Oct. 7, 2014

(54) POWER AND MANAGEMENT DEVICE AND METHOD

(75) Inventor: Timothy Luke Farnsworth, Sheffield (GB)

(73) Assignee: NXP, B.V., Eindhoven (NL)

( * ) Notice: Subject to any disclaimer, the term of this patent is extended or adjusted under 35 U.S.C. 154(b) by 74 days.

(21) Appl. No.: 13/331,067

(22) Filed: Dec. 20, 2011

(65) Prior Publication Data

US 2012/0161730 A1    Jun. 28, 2012

(30) Foreign Application Priority Data

Dec. 23, 2010    (EP) ..................................... 10196871

(51) Int. Cl.
*H02M 3/18*    (2006.01)
*H02M 3/07*    (2006.01)
*H02N 2/18*    (2006.01)

(52) U.S. Cl.
CPC ................. *H02M 3/07* (2013.01); *H02N 2/181* (2013.01)
USPC ............................................ 363/59; 307/110

(58) Field of Classification Search
USPC .......... 363/59, 60, 61; 307/109, 110; 327/536
See application file for complete search history.

(56) References Cited

U.S. PATENT DOCUMENTS

| 5,532,916 | A  | * | 7/1996  | Tamagawa ...................... 363/62 |
| 5,734,205 | A  | * | 3/1998  | Okamura et al. ............. 307/110 |
| 6,169,673 | B1 | * | 1/2001  | McIntyre et al. ............... 363/59 |
| 6,172,576 | B1 | * | 1/2001  | Endo et al. ................ 331/116 R |
| 6,278,318 | B1 | * | 8/2001  | Watanabe ..................... 327/536 |
| 6,317,343 | B1 | * | 11/2001 | Okamura et al. ................ 363/59 |
| 6,407,483 | B1 | * | 6/2002  | Nunuparov et al. .......... 310/339 |
| 6,794,926 | B2 | * | 9/2004  | Rader et al. .................... 327/536 |
| 7,692,411 | B2 | * | 4/2010  | Trainor et al. ................. 320/166 |
| 7,907,430 | B2 | * | 3/2011  | Kularatna et al. ............... 363/59 |
| 2009/0219078 | A1 | * | 9/2009  | Chu et al. ...................... 327/536 |
| 2009/0230924 | A1 | * | 9/2009  | Wright .......................... 320/148 |
| 2009/0256626 | A1 | * | 10/2009 | Hsieh et al. .................... 327/536 |

(Continued)

FOREIGN PATENT DOCUMENTS

| EP | 1 035 637 A2   | 9/2000 |
| EP | 1 050 955 A1   | 11/2000 |
| GB | 2 444 093 A    | 5/2008 |
| WO | 2009/153714 A1 | 12/2009 |

OTHER PUBLICATIONS

Maurath, D. et al. "A Self-Adaptive Switched-Capacitor Voltage Converter with Dynamic Input Load Control for Energy Harvesting", IEEE, Proc. of 2009 ESSCIRC, 4 pgs. (Sep. 2009).

(Continued)

*Primary Examiner* — Adolf Berhane
*Assistant Examiner* — Kyle J Moody (57) ABSTRACT

A power management device comprises: an input for receiving a transient energy pulse; a first storage section and a second storage section for storing energy from the input; an output; a switching section for selectively connecting the input, first storage section, second storage section and output in at least first and second configurations, wherein in the first configuration the first and second storage sections are connected so as to distribute energy from the transient energy pulse between the first and second storage sections, in the second configuration the respective voltages across the first and second storage sections are combined additively to produce an output voltage at the output, whereby the output voltage after switching to the second configuration is greater than the output voltage before switching to the second configuration.

16 Claims, 5 Drawing Sheets

(56) References Cited

U.S. PATENT DOCUMENTS

2009/0273955 A1* 11/2009 Tseng et al. .................. 363/60
2011/0227633 A1* 9/2011 Mo et al. ..................... 327/517
2012/0170770 A1* 7/2012 Lesso et al. ................. 381/107

OTHER PUBLICATIONS

Extended European Search Report for EP Patent Appln. No. 10196871.7 (Jun. 17, 2011).

* cited by examiner

PRIOR ART

FIG. 1

PRIOR ART

POWER AND MANAGEMENT DEVICE AND METHOD

This application claims the priority under 35 U.S.C. §119 of European patent application no. 10196871.7, filed on Dec. 23, 2010, the contents of which are incorporated by reference herein.

FIELD OF THE INVENTION

This invention relates to a power management device and method, and more particularly to a device and method for managing power from a transient power source.

BACKGROUND OF THE INVENTION

Figure 1:
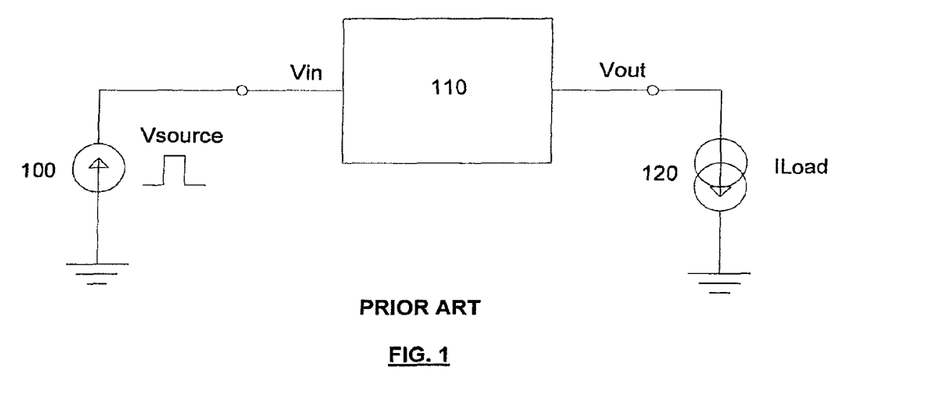
FIG. 1 shows a prior art arrangement using a power management device.
Figure 2:
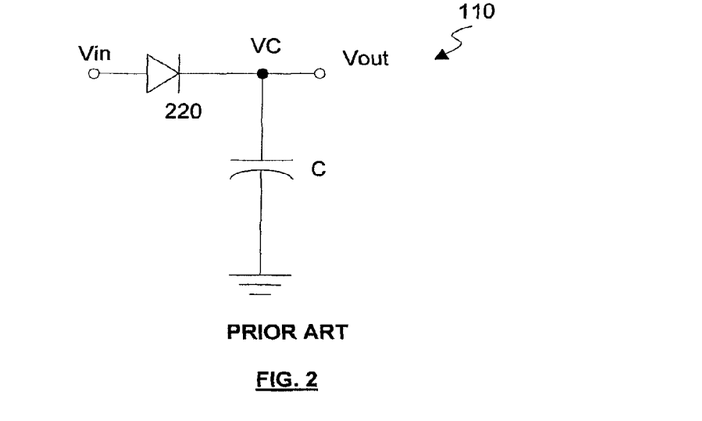
FIG. 2 is a circuit diagram of a prior art power management device.

It is common for electronic circuits have a continuous energy supply, such as a steady dc voltage, during operation. However, in some cases it may be necessary to use a power source that is transitory or transient in nature, such as the energy pulse generated by a piezoelectric generator. Piezoelectric generators and other forms of energy harvesting device are finding use in a wide range of applications where it is undesirable or impossible to provide a wired power supply or where replacement of batteries is impractical. Energy harvesting is also beneficial for the environment, by reducing the need for production and disposal of batteries, which include toxic components, and by making use of renewable energy sources and "waste" energy. An example of an application using a piezoelectric generator is in powering a wireless switch. The switch may emit a radio signal when actuated, for example, to turn on or off a device configured to receive the signal. The switch may be arranged such that actuation strikes a piezoelectric crystal, generating a voltage pulse. This pulse charges a capacitor, which in turn powers a radio circuit that emits the signal, avoiding the need for a battery or other stored power source.

Where power is supplied by transient energy pulse, it is known to use the energy pulse to charge a capacitor, and the energy stored on the capacitor may then be used to power an electronic circuit or system. An exemplary arrangement is shown in FIG. 1, which shows a voltage source 100 that generates a transient signal $V_{in}$ that is passed to power management circuit 110. Power management circuit 110 supplies a current $I_{Load}$ to power an electronic system 120. The power management circuit 110 is shown in more detail in FIG. 2, and includes a capacitor C which acts as a storage element and is charged by the energy pulse received at $V_{in}$. A diode 220 between the capacitor C and $V_{in}$ prevents a current flowing from the capacitor to $V_{in}$ when the voltage across C, $V_C$, is greater than that at $V_{in}$, such as immediately following the energy pulse. The voltage $V_C$ is supplied to $V_{out}$, which connects to the circuit or system to be powered ($I_{Load}$).

SUMMARY OF THE INVENTION

In accordance with the present invention there is provided a power management device comprising: an input for receiving a transient energy pulse; a first storage section and a second storage section for storing energy from the input; an output; a switching section for selectively connecting the input, first storage section, second storage section and output in at least first and second configurations, wherein the first configuration the first and second storage sections are connected so as to distribute energy from the transient energy pulse between the first and second storage sections, in the second configuration the respective voltages across the first and second storage sections are combined additively to produce an output voltage at the output, whereby the output voltage after switching to the second configuration is greater that the output voltage before switching to the second configuration.

The power management device may be such that the output voltage immediately after switching to the second configuration is greater than the output voltage immediately before switching to the second configuration.

The switching section may be arranged to switch to the second configuration when the voltage across the output decays to a threshold voltage.

The switching section may be switched based on output from at least one of: a voltage comparator, or a timer circuit.

The power management device may further comprise a diode or rectifier between (i) the input and (ii) the first and second storage sections.

The switching section may switch the input, first storage section, second storage section and output via an intermediate configuration when switching from the first configuration to the second configuration, and the intermediate configuration may isolate the second storage section from the first storage section.

The switching section may be arranged to switch to a third configuration in which the first storage section is (i) disconnected from the second storage section and the output, and (ii) partially discharged, and the switching section may be arranged to switch from the first configuration to the third configuration, and then to the second configuration.

The power management device may further comprise a third storage section switchably connectable to the first storage section, wherein in the third configuration the first storage section is connected to the third storage section so as to charge the third storage section by discharge of the first storage section.

In the third configuration the first storage section and the third storage section may be connected in parallel.

The power management device may further comprise a load circuit arranged to receive energy from the output, the load circuit having a maximum input voltage, wherein the first storage section is partially discharged in the third configuration, whereby the output voltage does not exceed the maximum input voltage when the power management device is switched to the second configuration by the switching section.

The first storage section may include a first storage element switchably connected to a second storage element, and the switching section may be arranged to switch the second storage element from a state in which it is disconnected from the first storage element to a state in which it is connected to the first storage element in order to charge the second storage element before switching to the second configuration.

The power management device may further comprise a load circuit arranged to receive energy from the output, the load circuit having a minimum operating voltage, wherein the switching section switches from the first configuration when the output voltage reaches or goes below a threshold, wherein the threshold is substantially equal to the minimum operating voltage.

The power management device may be arranged such that the voltage produced at the output immediately before switching to the second configuration is non-zero.

The invention also provides a power supply comprising: the power management device, and a transient power source arranged to provide the transient energy pulse to the power management device.

The transient power source may be a piezoelectric generator.

The invention further provides a power management device comprising: first and second capacitors arranged in parallel for storing energy received from an energy pulse supplied by a transient power source, and for providing the stored energy to an output; a switching section for switching the first and second storage sections into a series arrangement for providing the stored energy to the output.

The switching section may switch the first and second capacitors to the series arrangement when it is determined that a predetermined time period has elapsed, or a voltage at the output is (i) less than a predetermined level, or (ii) less than or equal to a predetermined level.

The switching section may be arranged to switch the first and second capacitors into a third configuration after the first configuration and before second configuration, and the third configuration may be arranged to at least partially discharge the first capacitor.

In the third configuration the first capacitor may be connected in parallel with a third capacitor, so as to charge the third capacitor by the at least partial discharge of the first capacitor, and in the third configuration the second capacitor may be connected to the output so as to produce a voltage at the output.

The invention also provides a method of supplying power, the method comprising: a step of receiving at an input an energy pulse from a transient power source; storing energy from the energy pulse by first and second energy storage sections arranged in a first configuration; producing, by the first and second storage sections, an output voltage at an output; switching the first and second energy storage sections to a second configuration, such that the output voltage is greater immediately after the switching than immediately before the switching.

The method according may further comprise: after the storing and before the switching to the second configuration, switching to a third configuration in which the first energy storage section is isolated from the output and is partially discharged, and an output voltage is produced at the output by the second energy storage section.

BRIEF DESCRIPTION OF THE DRAWINGS

Embodiments of the invention are further described hereinafter with reference to the accompanying drawings, in which.

DETAILED DESCRIPTION OF EMBODIMENTS

The invention will now be illustrated by reference to non-limiting examples that are intended to describe rather than define the present invention.

Figure 3:
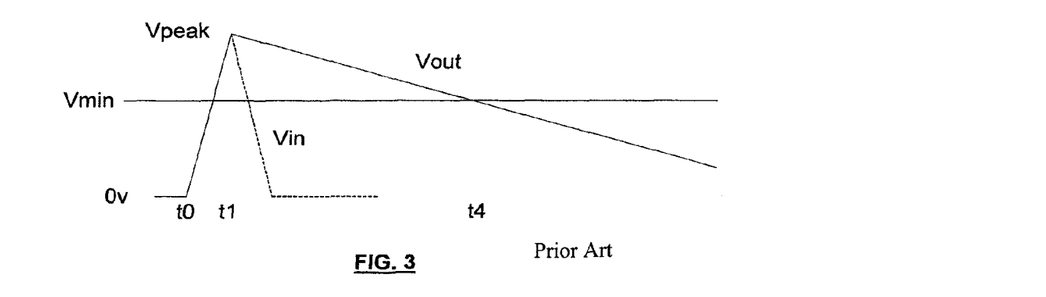
FIG. 3 is a simplified example of input and output voltages when the prior art device of FIG. 2 is supplied with an energy pulse.

FIG. 3 shows a simplified example of the input and output voltages $V_{in}$ and $V_{out}$ in the arrangement of FIG. 1. An initial input energy pulse, which is triangular in this example, starts at time $t_0$ and peaks at time $t_1$, charging the capacitor C and producing a potential at $V_{out}$ equal to that at $V_{in}$. The energy pulse at $V_{in}$ then drops rapidly to 0V, but the diode 220 prevents current flowing from the capacitor C to $V_{in}$. $V_{out}$ decays as current flows from the capacitor C to the load circuit connected at $V_{out}$. The decay of $V_{out}$ is shown here as a linear decrease. In practice, the rate and form of the decay will depend on the nature of the circuit connected to $V_{out}$. For example, if the circuit has a constant resistance, the decay would be exponential.

In most cases, the circuit or system to be powered has a minimum operating voltage, below which it cannot operate. This is shown as $V_{min}$ in FIG. 3. When $V_{out}$ is below $V_{min}$ (at time $t_4$ in FIG. 3) the circuit to be powered ceases to operate.

The inventor of the present invention has realized that the energy that remains stored on the capacitor when the output voltage decays below a minimum operating voltage of a load circuit is not used, and that greater efficiency can be achieved if the output voltage is converted to a higher potential when it reaches the minimum operating voltage. This increases the duration in which $V_{out}$ is above the minimum operating voltage, permitting the circuit attached to $V_{out}$ to operate for longer, and potentially complete more complex tasks.

The present invention is directed to overcoming deficiencies in prior art power supplies for use with transient power sources, and increasing the energy utilized from the transient source.

Figure 4:
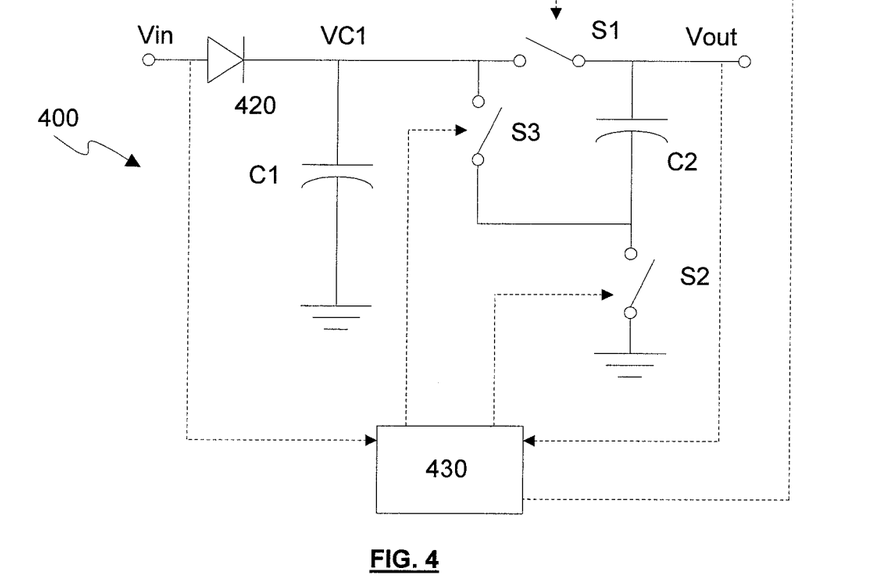
FIG. 4 is a circuit diagram illustrating an embodiment of the invention.

FIG. 4 shows a power management circuit 400 according to an embodiment of the invention. The power management circuit 400 of FIG. 4 includes a first capacitor C1, linked to an input node $V_{in}$ via a diode 420. The circuit of FIG. 4 also includes a second capacitor C2 and first through third switches S1, S2 and S3. The switches are arranged to selectively connect the first and second capacitors C1, C2 in series and parallel arrangements. In particular, the switches are arranged so that when the first and second switches S1 and S2 are closed and the third switch S3 is open, the first capacitor C1 and the second capacitor C2 are connected in parallel. Furthermore, when the first and second switches S1 and S2 are open and the third switch S3 is closed, the first capacitor C1 and the second capacitor C2 are connected in series. In the present embodiment, the first switch S1 is positioned between the positive plate of the first capacitor C1 and the positive plate of the second capacitor C2, while S2 is between the positive plate of the first capacitor C1 and the negative plate of the second capacitor C2. The second switch S2 is between the negative plate of C2 and ground (earth).

The circuit of FIG. 4 is arranged to receive a positive voltage at $V_{in}$ (i.e. a positive voltage component will pass the diode 420, but as would be apparent to the skilled person, the circuit could be arranged with opposite polarities, that is reversing the diode 420 and receiving a negative voltage at $V_{in}$ (i.e. such that a negative voltage component passes the diode 420). In this case, the positive and negative plates of the capacitors would be reversed relative to the above description. The capacitors themselves need not have an intrinsic polarity, and could be standard parallel plate capacitors, for example.

The first through third switches S1, S2 and S3 form part of a switching section that additionally includes a controller 430 for the switches. The switches S1, S2 and S3 may be embodied by switching devices such as transistors, FETs or any other components that achieve the switching function described herein. The controller 430 for the switches may include a microprocessor, voltage comparator or other component(s) suitable for controlling the switches S1, S2 and S3 as described herein. FIG. 4 illustrates the operational connection between the controller 430 and the switches S1, S2 and S3 by dashed lines leading to the switches. The controller 430 may also receive information on the voltages at $V_{in}$ and/or $V_{out}$, and this is shown by dashed lines leading to the controller 430. The controller 430 could, alternatively or in addition to information on $V_{in}$, receive information on the voltage on the other side of the diode 420 from $V_{in}$. The controller may be embodied by any suitable component or components. For example, the controller may include an application-specific integrated circuit (ASIC). In some embodiments the controller may be arranged as a bistable or tri-stable circuit, and may include a voltage comparator, operational amplifier and/or timing circuit.

The switching section is arranged so that, when an energy pulse is received via $V_{in}$, the power management circuit 400 is in a first configuration, in which the first and second capacitors C1 and C2 are connected in parallel. In this configuration both capacitors are charged by the energy pulse. In the embodiment of FIG. 4, this corresponds to S1 and S2 being closed and S3 being open. In the arrangement of FIG. 4 C1 and C2 may have the same capacitance values, but this is not essential. Both capacitors C1 and C2 may be charged to the same voltage, but this need not be the case in all embodiments. As a result of the arrangement in FIG. 4, the sum of the peak voltages across each of the capacitors C1 and C2 is greater than the peak input voltage, although in the first configuration the voltages across C1 and C2 are not combined additively.

The switching section is further arranged such that, after the energy pulse, the power management circuit 400 is switched to a second configuration, in which the first and second capacitors C1 and C2 are in series. Accordingly, the voltages across each of the capacitors C1 and C2 combine additively to produce an output voltage at $V_{out}$ that is greater than the voltage across either of C1 or C2 individually.

A circuit of system to be powered, herein referred to as a load circuit, is connected at note $V_{out}$.

Figure 5:
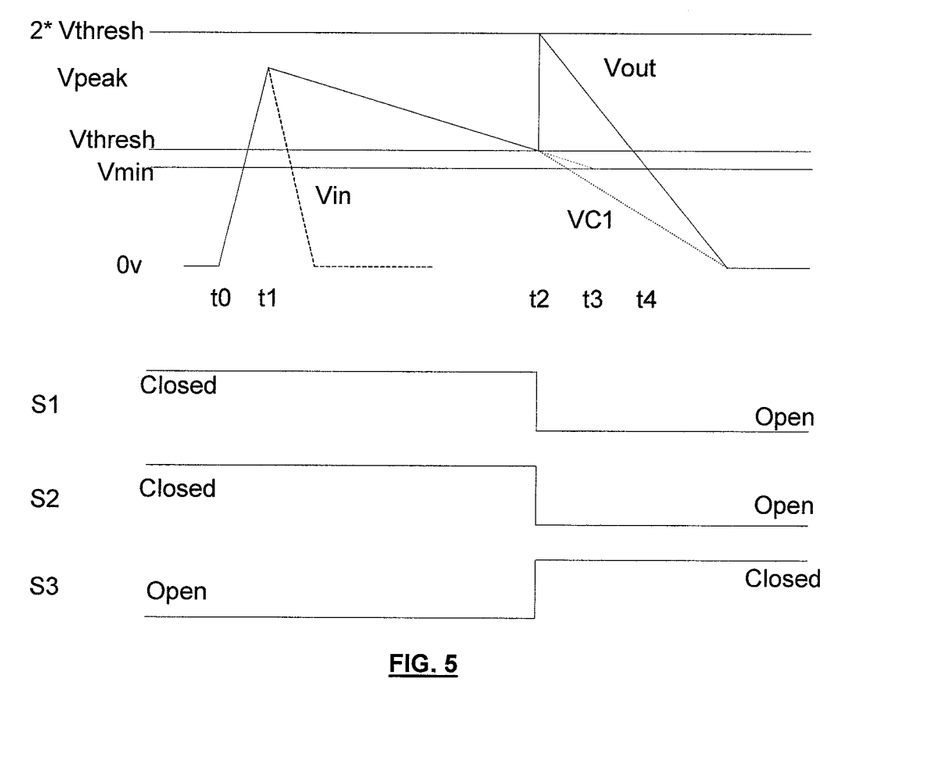
FIG. 5 illustrates example input and output voltages when the device of FIG. 4 is supplied with an energy pulse, and also shows the states of the switches in FIG. 4.

FIG. 5 shows the variation of input and output voltages with time according to an exemplary embodiment of the arrangement of FIG. 4. FIG. 5 also shows the states of the switches S1, S2 and S3. "Closed", ie. conducting, is shown as a high signal and "Open", i.e. non-conducting, is shown as a low signal.

As can be seen in FIG. 5, the power management circuit 400 is initially in the first configuration, such that the capacitors C1 and C2 are in parallel (S1 and S2 closed, S3 open). At time $t_0$ an energy pulse is received at $V_{in}$, charging both of the capacitors C1 and C2. The energy pulse may be from any transient power source, and may be from a piezoelectric generator, for example. The form of $V_{in}$ is not particularly limited, other than being transient. Transient herein is used to describe a signal that is initially zero, then non-zero for a short period, and then zero again. The period in which $V_{in}$ is non-zero is short relative to the period in which $V_{in}$ is 0V, and is also short relative to the period of operation of the load circuit after $V_{in}$ returns to 0V. As would be understood by the skilled person, a transient energy pulse is distinguished from a dc input voltage. The shape of $V_{in}$ is not particularly limited. $V_{in}$ is illustrated with a linear increase and decrease and a single peak, but other possibilities exist, and $V_{in}$ can have any shape consistent with the above description of a transient signal.

At time $t_1$, the capacitors C1 and C2 have been charged to the voltage Vpeak and the energy pulse begins to decrease toward zero, as reflected by the input voltage $V_{in}$ in FIG. 5. The charge (and energy) stored on the capacitors C1 and C2 decreases, schematically shown as a linear decrease (although the skilled person would appreciate that the decrease may take other forms), until the output voltage $V_{out}$ reaches a threshold voltage $V_{thresh}$. Where the load circuit has an associated minimum operating voltage $V_{min}$, $V_{thresh}$ is preferably equal to or slightly higher than $V_{min}$.

At $t_2$ the output voltage $V_{out}$ reached $V_{thresh}$, and the switching section switches the power management circuit 400 to the second configuration. In the second configuration, S1 and S2 are open and S3 is closed, and the capacitors are in series. Thus, the voltages across the capacitors C1, C2 are combined additively, and the output voltage increases. In the arrangement of FIG. 4, $V_{out}$ is increased to $2 \times V_{thresh}$, the sum of $V_{C1}$ and $V_{C2}$, the voltages across C1 and C2, respectively.

As a result of the switching section switching the power management circuit 400 to the second configuration, $V_{out}$ is increased, remaining above $V_{thresh}$, and also above $V_{min}$. This extends the period of time in which $V_{out}$ is greater that $V_{min}$, permitting the load circuit to operate for a longer period of time than in the arrangement of FIG. 2. The load circuit can operate until $V_{out}$ crosses (becomes smaller than) $V_{min}$ at $t_4$. On the other hand, if the power management circuit 400 remained in the first configuration and was not switched to the second configuration, the load circuit would be able to operate only until $t_3$ when $V_{out}$ would have crossed $V_{min}$.

In the second configuration, $V_{out}$ decreases more rapidly than in the first configuration, as the combined capacitance of C1 and C2 is switched from C1+C2 in the first configuration to $(1/C1 + 1/C2)^{-1}$ in the second configuration.

According to this arrangement, no power is drawn from $V_{source}$ after the initial charging period, as $V_{source}$ is transient.

In some embodiments $V_{thresh}$ could be set equal to or less than $V_{min}$. Where the output voltage $V_{out}$ drops below $V_{min}$, the load circuit may cease to function, but would resume or restart functioning when the power management circuit 400 switched to the second configuration, assuming $V_{out}$ then exceeds $V_{min}$. Where it is acceptable or desirable for such resuming or restarting, $V_{thresh}$ may be less than $V_{min}$.

The switching section may include a voltage comparator in order to determine when $V_{out}$ reaches $V_{thresh}$ and cause the power management circuit 400 to switch to the second configuration when $V_{out}$ is less than $V_{thresh}$ (or when $V_{out}$ is equal to $V_{thresh}$). In an alternative embodiment, the switching section may include a timer. In this case, the energy pulse would start (or reset) the timer, and the switching section would cause the power management circuit to switch to the second configuration after a time period (approximating the period of time between $t_0$ and $t_2$) has elapsed. $V_{out}$ at the end of this time period would define $V_{thresh}$, and the time period may be selected such that $V_{thresh}$ approximates a particular voltage, such as $V_{min}$. The time period may be determined by the switching section, and may be a fixed time period. The time period may be variable, being determined by the switching section based on the value of Vpeak, for example. Other factors could be used to determine the time period.

The switching section may be arranged to switch each of switches S1, S2 and S3 simultaneously. Alternatively, one or more of the switches S1, S2, S3 can be switched separately. Where the switches are not switched simultaneously, they are preferably switched according to a predetermined sequence. In the embodiment of FIG. 4, a preferred sequence of switching is S1 and S2 opening simultaneously or in sequence, followed by S3 closing as quickly as possible thereafter, or at least a short period thereafter. This sequence ensures that S2 and S3 are not closed at the same time, and so prevents the positive terminal of C1 being connected to ground, which would allow charge from C1 to flow to ground without passing through the load circuit.

FIG. 5 shows $V_{out}$ decaying to 0V after $t_4$ at the same rate as before $t_4$. However, this is not necessarily the case, and $V_{out}$ may remain constant, decay more slowly, or decay more rapidly. For example, the controller 430 may be arranged to disconnect (e.g. by a further switch that is not illustrated) the load circuit from $V_{out}$ when it is determined that $V_{out}$ is below $V_{thresh}$ at $t_4$. Assuming negligible leakage, this would result in $V_{out}$ remaining constant at, or just below, $V_{thresh}$ until another energy pulse is received at $V_{in}$. Where leakage is not negligible, $V_{out}$ would continue to decay, but more slowly than before $t_4$. The switching section may be arranged to switch the power management circuit to the first configuration at or after $t_4$, in readiness for a next energy pulse. In this case, $V_{out}$ would be reduced abruptly (e.g. halved) when switching from the second to the first configuration.

Figure 8:
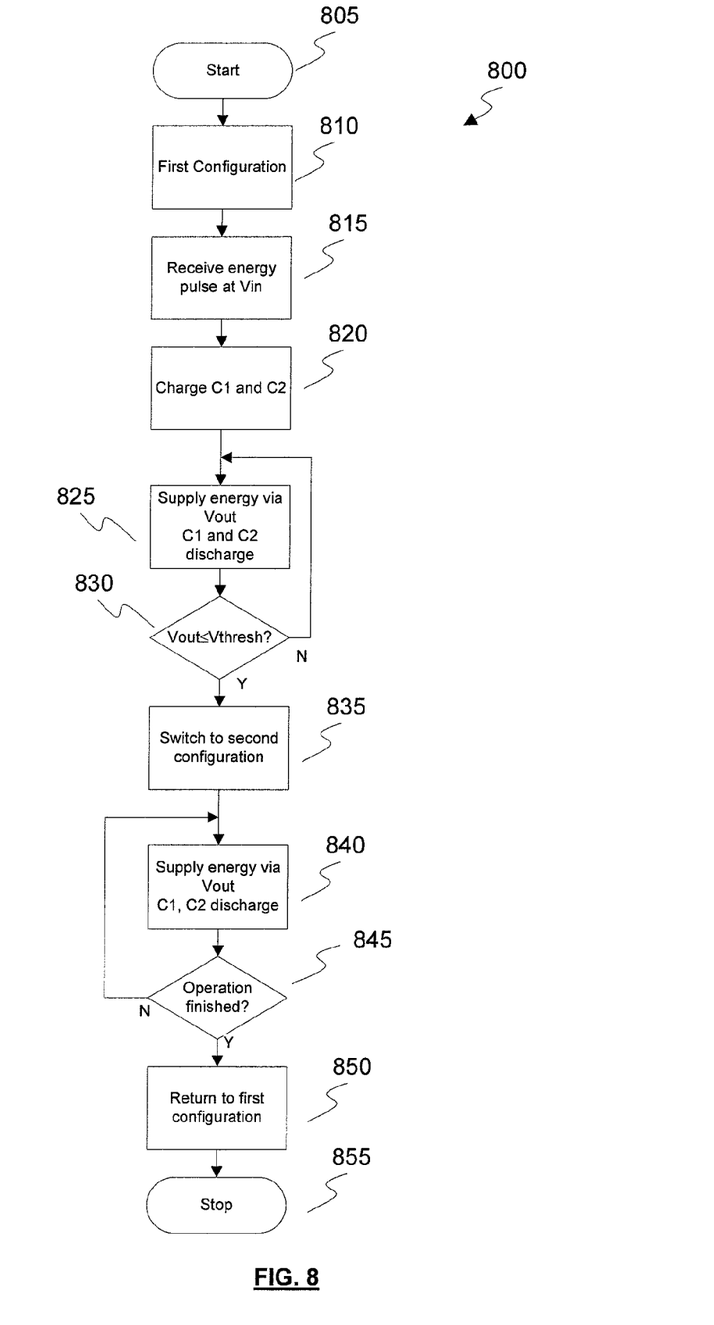
FIG. 8 is a flow chart showing a method of operation according to the invention and usable with the arrangement of FIG. 4.

FIG. 8 illustrates a method 800 performed by an exemplary embodiment of the arrangement of FIG. 4. The method starts at step 805 and at step 810 the power management circuit 400 is in the first configuration. The energy pulse is received at step 815 and charges capacitors C1 and C2 at step 820. Energy is supplied via $V_{out}$ at step 825, and C1 and C2 discharge accordingly. Steps 815, 820 and 825 may be performed simultaneously. At step 830 the switching section determines whether $V_{out} \le V_{thresh}$. Alternatively, the switching section could determine whether $V_{out} \ge V_{thresh}$. If $V_{out}$ is determined to be greater than $V_{thresh}$, the method returns to step 825. When $V_{out}$ is determined to be less than or equal to $V_{thresh}$, the method continues to step 835, where the power management circuit 400 is switched to the second configuration, in which C1 and C2 are connected in series and the voltages across C1 and C2 combine additively, resulting in an increase in $V_{out}$. At step 840 the power management circuit 400 continues to supply energy via $V_{out}$, and C1 and C2 continue to discharge. At step 845 a determination is made as to whether the operation has completed. This could be based on, for example: (i) a time elapsed since receiving the energy pulse; (ii) whether $V_{out}$ has decreased to or below $V_{min}$, in which case the load circuit may be unable to continue to operate; or (iii) whether the load circuit has completed the functions it is required to perform and no longer needs energy. If it is determined that operation is not completed, the method returns to step 840. If it is determined that operation is completed, the switching section returns the power management circuit 400 to the first configuration (step 850), in preparation for receiving a subsequent energy pulse. The method then ends at step 855. The determination that operation has finished need not require an active decision-making element. Furthermore, the power management circuit 400 may be arranged to return to the first configuration when a next energy pulse is received, or between energy pulses. For example, the switches S1, S2 and S3 may be arranged to default to the first configuration in the absence of a signal generated by the energy stored on C1 and C2. In such cases, step 845 may be unnecessary or may be performed passively.

Generally, dc-dc converter circuits, for converting an input dc voltage to an output dc voltage, are known, but these are intended for use with a continuous source of power, and work by continually drawing power from the input dc source. Thus, such converter circuits are not suitable for use when the power source is transient, and there is no energy available between the transient powering events, which may be a long time. Furthermore, dc-dc converters typically include a large number of components, and may draw a significant amount of energy compared with the energy available from a transient source. For these reasons, conventional dc-dc converter circuits may not be suitable for use with a transient power source.

Figure 6:
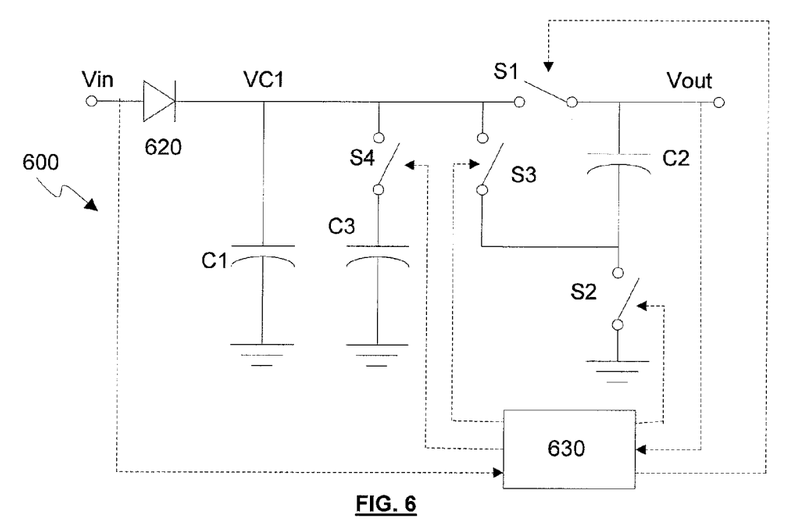
FIG. 6 is a circuit diagram illustrating another embodiment of the invention.

FIG. 6 shows another embodiment of the present invention. The embodiment of FIG. 6 is similar to that of FIG. 4, with an additional capacitor, C3 and an additional switch S4. The other components of FIG. 6 are as described above in relation to the corresponding components of FIG. 4.

Capacitor C3 and switch S4 are arranged in series with each other, and both are in parallel with capacitor C1. The controller 630 of the switching section is arranged to control switch S4, in addition to switches S1, S2 and S3. In the first configuration S4 is open, and so there is no connection between C3 and either of C1 and C2. In the second configuration S4 is closed so that C3 is in parallel with C1 and each of C1 and C3 are in series with C2.

The arrangement of FIG. 6 is particularly advantageous when the load circuit has a maximum operating voltage, $V_{max}$, which $V_{out}$ must not exceed. In the power management device of FIG. 4, when $V_{max}$ is less than $2 \times V_{thresh}$ (or the sum of voltages across C1 and C2) the output voltage $V_{out}$ immediately after switching to the second configuration will exceed $V_{max}$, possibly damaging the load circuit. The arrangement of FIG. 6 can be used to avoid $V_{out}$ exceeding $V_{max}$.

Figure 7:
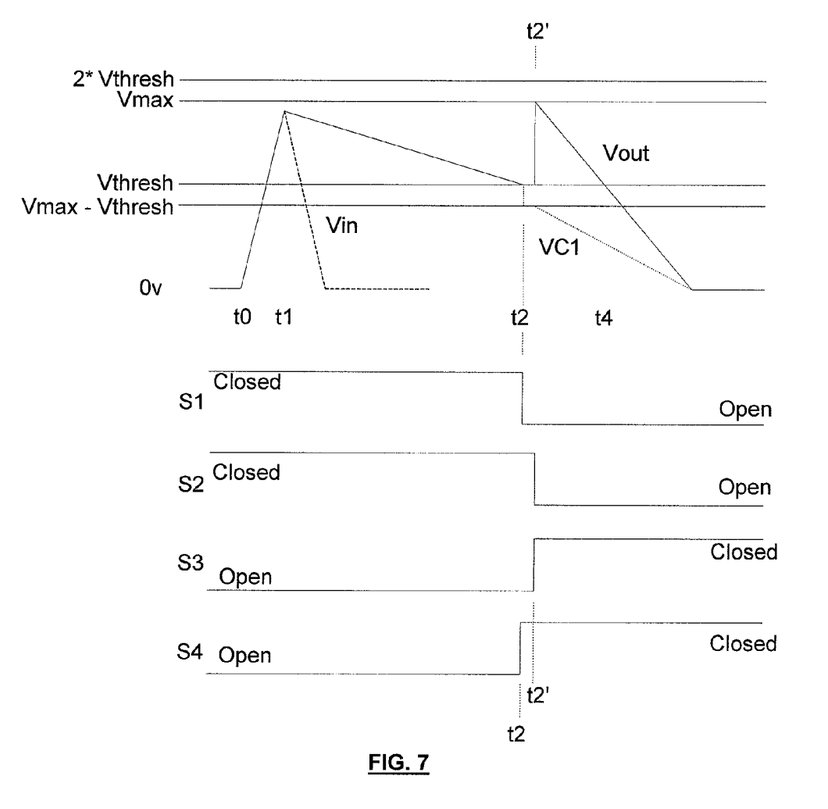
FIG. 7 illustrates example input and output voltages when the device of FIG. 6 is supplied with an energy pulse, and also shows the states of the switches in FIG. 6.

FIG. 7 shows the variation of input and output voltages with time according to an exemplary embodiment of the invention. FIG. 5 also shows the states of the switches S1, S2, S3 and S4. As in FIG. 5, a high signal shows as "Closed", or conducting, state, and a low signal shows an "Open" or non-conducting state.

FIG. 7 shows that initially the circuit is in the first configuration, with capacitors C1 and C2 in parallel (S1 and S2 closed, S3 and S4 open). At time $t_0$ an energy pulse is receive as $V_{in}$, charging each of the first and second capacitors C1 and C2. At time $t_1$, the capacitors C1 and C2 have been charged to the peak voltage Vpeak and the energy pulse ($V_{in}$) begins to decrease to zero. In some arrangements, the capacitors will not necessarily be charged completely to Vpeak, and may be charged to a lower voltage, for example. The charge stored on the capacitors C1 and C2 decreases as the capacitors discharge through the load circuit via node $V_{out}$. As in FIG. 5, the discharge is illustrated as linear, but may take other forms. Due to diode 620 providing isolation between $V_{in}$ and $V_{out}$ and the charge stored on the capacitors C1, C2, $V_{out}$ decreases at a different rate (more slowly than) $V_{in}$.

At time $t_2$, the output voltage $V_{out}$ reaches the threshold $V_{thresh}$, and the switching section switches the power management circuit to a third configuration. In the third configuration the first capacitor C1 is disconnected from the second capacitor C2, and connected in parallel to the third capacitor C3. Capacitor C3 is initially discharged, according to the current example, and so in the third configuration charge is transferred from the first capacitor C1 to the third capacitor C3. In the third configuration, C2 remains connected to $V_{out}$, providing power to the load circuit via $V_{out}$ At time $t_2'$ the switching section switches the power management circuit to the second configuration, in which the first and third capacitors are in parallel with each other, and the second capacitor C2 is in series with each of C1 and C3. This causes the output voltage to increase to the sum of the voltages across the first and second capacitors C1 and C2. If the interval between $t_2$ and $t_2'$ is sufficient to fully charge C3, the voltage across C3 will equal the voltage across C1, but this is not essential. The interval between $t_2$ and $t_2'$ is not particularly limited, but typically would be chosen to be relatively short, being just long enough for C1 to discharge into C3, such that $V_{C1}$ and $V_{C3}$ are generally equal.

After $t_2'$, the output voltage $V_{out}$ decreases. At $t_4$ $V_{out}$ reaches $V_{min}$, and $V_{out}$ is then too low to power the load circuit. As described in relation to FIG. 5, various possibilitier exits for $V_{out}$ after $t_4$. For example, $V_{out}$ may continue decreasing, remain at or just below $V_{thresh}$, or may change abruptly.

Figure 9:
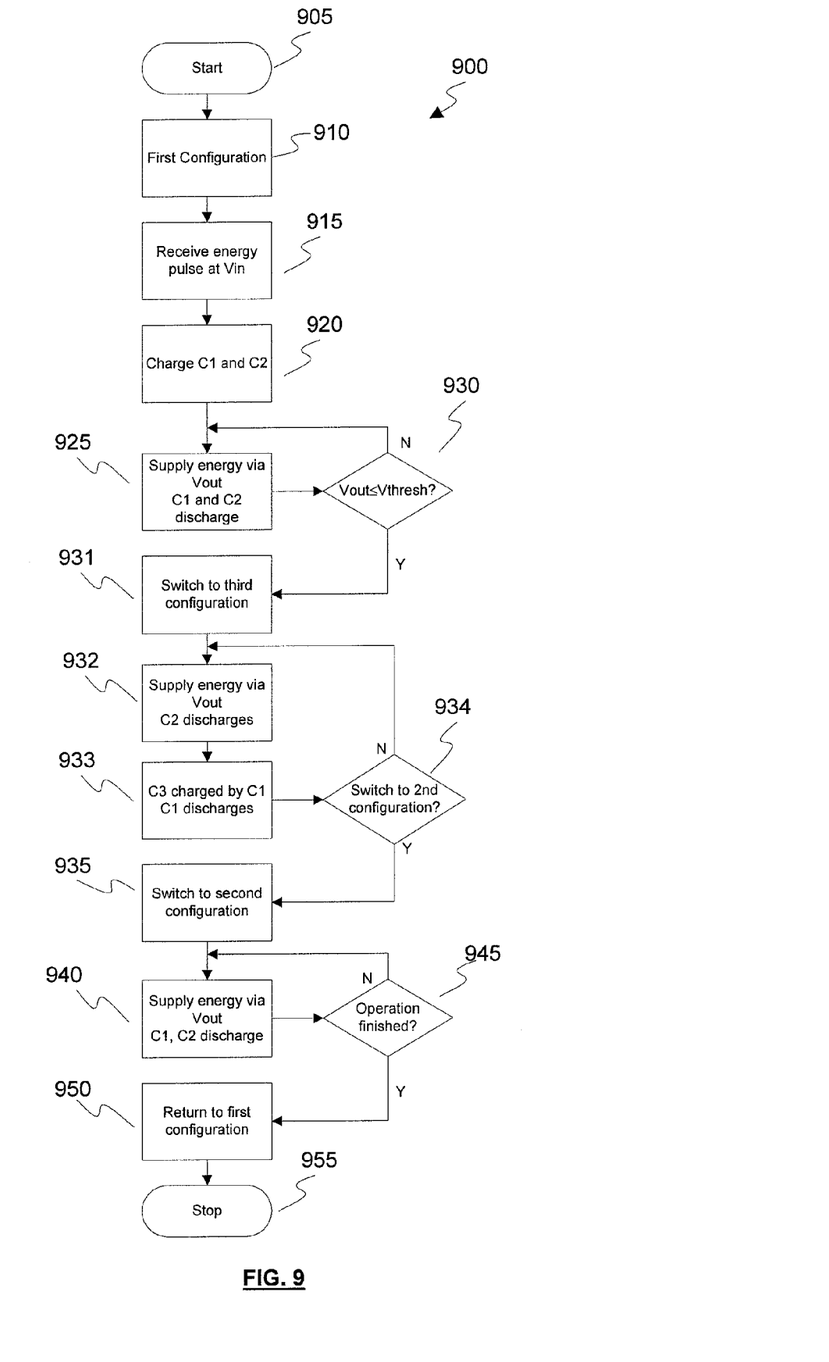
FIG. 9 is a flow chart showing a method of operation according to the invention and useable with the arrangement of FIG. 6.

FIG. 9 illustrates a method 900 suitable for use with the embodiment of FIG. 6. Steps 905, 910, 915, 920, 925, 930, 935, 940, 945, 950 and 955 respectively correspond to steps 805, 810, 815, 820, 825, 830, 835, 840, 845 850 and 855, described above in relation to FIG. 8. FIG. 9 also includes steps 931, 932, 933 and 934. In the method of FIG. 9, after it is determined in step 930 that the output voltage is less than or equal to the threshold voltage, the method proceeds to step 931, in which the power management device 400 is switched to the third configuration. Energy is then supplied to $V_{out}$ by C2 (step 932) and C2 discharges, although as noted above, the discharge of C2 in this configuration may be negligible. In step 934 charge is transferred from C1 to C3, charging C3 with a corresponding discharge of C1. Steps 932 and 933 may occur simultaneously, depending on the relative timing of the switches S1 and S4. At step 934, it is determined whether the power management circuit 400 should be switched to the second configuration. This determination could be based on a predetermined time delay following the switch to the third configuration and/or could be based on the voltage across C1, for example. The determination could additionally or alternatively be based on $V_{out}$. If it is determined that the power management circuit 400 should be switched to the second configuration, the method continues with step 935. Otherwise, the method returns to step 932.

According to the embodiment of FIG. 4, when the power management circuit is switched to the second configuration, $V_{out}$ increases to $2 \times V_{thresh}$. However, as noted above, the load circuit may have a maximum voltage that should not be exceeded, $V_{max}$. Moreover, it is possible that $2 \times V_{thresh}$ is greater than $V_{max}$. In such cases, the embodiment of FIG. 6 is particularly advantageous, and can be used to prevent $V_{out}$ exceeding $V_{max}$, even if $2 \times V_{thresh}$ is greater than $V_{max}$.

In some embodiments according to the arrangement of FIG. 6, the capacitance of the third capacitor C3 and/or the interval $t_2$-$t_2'$ can be chosen such that C1 is discharged to a level where $V_{C1}=V_{max}-V_{thresh}$ between $t_2$ and $t_2'$. In this case, assuming that the discharge of C2 is negligible between $t_2$ and $t_2'$, $V_{out}$ will increase to $V_{max}$. In some cases it will be desirable for the value of $V_{out}$ to increase to just below $V_{max}$ at time $t_2'$. More generally, the skilled person can select the capacitance of the third capacitor C3 such that the voltage increases to a desired peak value at time $t_2'$. If the discharge of the second capacitor C2 is not negligible between $t_2$ and $t_2'$, this can be taken into account based on actual or likely discharge rates through the load circuit.

According to the arrangement of FIG. 6, no power is drawn from $V_{source}$ after the initial charging period, as $V_{source}$ is transient.

In the arrangements of FIG. 4 and FIG. 6, the controller 430, 630 for the switches may be power by $V_{out}$ and could form part of the load circuit. In this case the load circuit would control switching of switches S1, S2, S3 and S4 (where present), while also performing the normal operations of the load circuit.

FIG. 5 shows switches S1, S2 and S3 switching at the same time, $t_2$. However, as noted above, other possibilities exist, and the switches could be arranged to switch in sequence one or two at a time. When S1 is arranged to open at time $t_2$, before S2 and S3 are closed at time $t_2'$ (not shown in FIG. 5), C2 will discharge while the charge on C1 remains the same (in the interval $t_2$-$t_2'$). This means that between $t_2$ and $t_2'$ the voltage across C2 will decrease while the voltage across C1 remains constant. Accordingly, by varying the period between $t_2$ and $t_2'$, the peak voltage at $t_2'$ can be controlled.

FIG. 7 shows S1 and S4 switched at the same time ($t_2$), and S2 and S3 switched together at time $t_2'$ after $t_2$. However, S4 could be closed before S1 is opened, for example. The order and timing of switching in FIGS. 5 and 7 is not particularly limited.

In some arrangement, S1 may be open when the voltage pulse is received. In this case, C1 is charged by the energy pulse, and C2 may be charged from C1 after the energy pulse has passed by closing S1. In this case, the initial arrangement is different from the first configuration and the power management circuit 400; 600 is switched to the first configuration after the energy pulse has passed.

The third capacitor C3 and fourth switch S4 in FIG. 6 form an additional stage relative to the arrangement of FIG. 4. Further stages could be added. For example, a fourth capacitor and fifth switch could be added in series with each other and in parallel with C1 and C3.

As would be appreciated by the skilled person, certain simplifying assumptions have been made in the foregoing description, in the interests of providing a clear description the present invention. For example, in reality $V_{source}$ is a real voltage or current source and may not behave as an idealized source, e.g. it may be finite impedance and/or limited energy. As previously noted, form of $V_{in}$ is not particularly limited, other than being transient. Transient herein is used to describe a signal that is initially zero, then non-zero for a short period, and then zero again. The period in which $V_{in}$ is non-zero is short relative to the period in which $V_{in}$ is 0V, and is also short relative to the period of operation of the load circuit after $V_{in}$ returns to 0V. As would be understood by the skilled person, a transient energy pulse is distinguished from a dc input voltage. The shape of $V_{in}$ is not particularly limited. $V_{in}$ is illustrated with a linear increase and decrease and a single peak, but other possibilities exist, and $V_{in}$ can have any shape consistent with the above description of a transient signal.

For simplicity, capacitors are shown having linear charging and discharging rates. However, the rate of charging and/or discharging may be non-linear.

Herein, each of capacitors C1 and C2 is charged to the same peak voltage. However, this is not necessarily the case and may depend on the specific circuit arrangement. Similarly, description of the voltage increasing to $2 \times V_{thresh}$ depends on the circuit arrangement, and other possibilities exist.

In practice the load circuit will not be an ideal current source, but a real impedance or circuit load.

The above embodiments include a diode 420, 620. However, any rectifying element could be used. In particular, if a full bridge rectifier is used, useful energy may still be obtained even if $V_{in}$ becomes negative. In some embodiments, a rectification element may be unnecessary. For example, if the connection to the source if the energy pulse may be broken (e.g. by a switch) soon after Vpeak is reached.

Switches S1, S2, S3 and S4 may be embodied by any suitable switching element, as would be clear to the skilled person. Transistors may be used, for example. The capacitance values of the capacitors C1, C2 and C3 could be appropriately selected by the skilled person, taking into account the voltage source and/or the load circuit, and are not particularly limited. The drawings use the circuit diagram symbol for fixed, non-polarized capacitors, but any suitable energy storage element could be used.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments.

The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A power management device comprising:
   an input for receiving a transient energy pulse that reaches a peak voltage level greater than a minimum voltage at which the device is powered for operating, and that is a signal that changes from a first voltage level to the peak voltage level and returns toward the first voltage;
   a first storage section and a second storage section for storing energy from the input in response to the transient energy pulse;
   an output; and
   a switching section for selectively connecting the input, first storage section, second storage section and output in at least first and second configurations, wherein
   in the first configuration the first and second storage sections are connected so as to distribute energy from the transient energy pulse between the first and second storage sections and to change the first and second storage sections to a charge voltage level greater than the minimum voltage, and wherein respective voltages across the first and second storage sections are not combined to produce a first output voltage at the output, and
   in the second configuration, respective voltages across the first and second storage sections are combined additively to produce a second output voltage at the output, wherein
   the second output voltage after switching to the second configuration is greater than both the minimum voltage and the first output voltage before switching to the second configuration.

2. The power management device according to claim 1, wherein
   the second output voltage immediately after switching to the second configuration is greater than the first output voltage immediately before switching to the second configuration, and
   wherein the first and second storage sections are configured and arranged to charge to a peak voltage of the transient energy pulse in the first configuration.

3. The power management device according to claim 2, wherein the switching section is arranged to switch to the second configuration in response to a voltage across the output decaying to a threshold voltage.

4. The power management device according to claim 3, wherein the switching section is switched based on an output from at least one of:
   a voltage comparator, and
   a timer circuit.

5. The power management device according to claim 1, further comprising one of a diode and a rectifier between the input and the first and second storage sections.

6. The power management device according to claim 1,
   wherein the first storage section includes a first storage element switchably connected to a second storage element,
   the switching section is arranged to switch the second storage element from a state in which it is disconnected from the first storage element to a state in which it is connected to the first storage element in order to charge the second storage element before switching to the second configuration, and
   wherein the first and second storage sections are configured and arranged to charge to a peak voltage of the transient energy pulse in the first configuration.

7. The power management device according to claim 1, further comprising a load circuit arranged to receive energy from the output, the load circuit having a minimum operating voltage, wherein
   the switching section switches from the first configuration when the output voltage reaches or goes below a threshold, wherein
   the threshold is substantially equal to the minimum operating voltage, wherein
   the first and second storage sections are configured and arranged to charge to a peak voltage of the transient energy pulse in the first configuration.

8. A power supply comprising:
   the power management device according to claim 1,
   a transient power source arranged to provide the transient energy pulse to the power management device,
   wherein the first and second storage sections are configured and arranged to charge to a peak voltage of the transient energy pulse in the first configuration.

9. A power management device comprising:
   an input for receiving a transient energy pulse that reaches a peak voltage level greater than a minimum voltage at which the device is powered for operating, and that is a signal that changes from a first voltage level to the peak voltage level and returns toward the first voltage;

a first storage section and a second storage section for storing energy from the input in response to the transient energy pulse;

an output; and a switching section for selectively connecting the input, first storage section, second storage section and output in at least first and second configurations, wherein in the first configuration the first and second storage sections are connected so as to distribute energy from the transient energy pulse between the first and second storage sections and to change the first and second storage sections to a charge voltage level greater than the minimum voltage, and wherein respective voltages across the first and second storage sections are not combined to produce an output voltage at the output, in the second configuration, respective voltages across the first and second storage sections are combined additively to produce a first output voltage at the output, wherein a second output voltage after switching to the second configuration is greater than both the minimum voltage and the first output voltage before switching to the second configuration, the switching section switches the input, first storage section, second storage section, and output via an intermediate configuration when switching from the first configuration to the second configuration, the intermediate configuration isolates the second storage section from the first storage section, and wherein the first and second storage sections are configured and arranged to charge to a peak voltage of the transient energy pulse in the first configuration.

10. The power management device according to claim 9, wherein:

the switching section is arranged to switch to a third configuration, in which the first storage section is disconnected from the second storage section, and the first storage section is partially discharged, and the switching section is arranged to switch from the first configuration to the third configuration, and then to the second configuration.

11. The power management device according to claim 10, further comprising:

a third storage section switchably connectable to the first storage section, wherein in the third configuration the first storage section is connected to the third storage section so as to charge the third storage section by discharge of the first storage section.

12. The power management device according to claim 11, wherein in the third configuration the first storage section and the third storage section are connected in parallel.

13. The power management device according to claim 10, further comprising a load circuit arranged to receive energy from the output, the load circuit having a maximum input voltage, wherein the first storage section is partially discharged in the third configuration, whereby a third output voltage does not exceed the maximum input voltage when the power management device is switched to the second configuration by the switching section.

14. The device of claim 9, wherein the switching section is arranged to switch to the second configuration in response to a voltage across the output decaying to a threshold voltage.

15. A method of supplying power, the method comprising:

a step of receiving at an input a transient energy pulse, having a peak voltage, from a transient power source that reaches a peak voltage level greater than a minimum voltage at which a device is powered for operating, and that is a signal that changes from a first voltage level to the peak voltage level and returns toward the first voltage;

in a first configuration, distributing and storing energy from the energy pulse between first and second energy storage sections in response to the transient energy pulse, the first and second storage sections being charged to the peak voltage and to change the first and second storage sections to a charge voltage level greater than the minimum voltage, and wherein respective voltages across the first and second storage sections are not combined to produce a voltage at an output;

producing, by the first and second energy storage sections, a first output voltage at the output; and switching the first and second energy storage sections to a second configuration to produce a second output voltage at the output, such that the second output voltage is greater immediately after the switching than immediately before the switching.

16. The method according to claim 15, further comprising:

after the storing and before the switching to the second configuration, switching to a third configuration in which the first energy storage section is isolated from the output and is partially discharged, and a third output voltage is produced at the output by the second energy storage section.

* * * * *